PREPARATION OF HALOGENATED UNSATURATED ACIDS

Irving L. Mador, Cincinnati, Ohio, and John A. Scheben, Erlanger, Ky., assignors to National Distillers and Chemical Corporation, New York, N.Y., a corporation of Virginia
No Drawing. Filed Feb. 3, 1964, Ser. No. 342,225
18 Claims. (Cl. 260—539)

This invention relates to a novel method for preparing halogenated unsaturated acids. More particularly, this invention pertains to the reaction between unsaturated hydrocarbons and alpha-halogenated carboxylic acids to form the halogenated unsaturated acids.

It is known in the art that X-rays or ultraviolet radiation will induce the addition of halogenated esters of acetic acid to 1,3-butadiene for the preparation of compounds which may be used as intermediates in the synthesis of lysine. See M. Leto and C. Hsia Chen, J. Organic Chem., 27, 3708 (1962). The need to employ halogenated esters as one of the starting materials, the X-ray or ultraviolet inducers, and the formation of undesirable complex by-products are some of the disadvantages which may be encountered when such a process is utilized in a large scale commercial operation.

One object of the present invention is to provide a process for preparing halogenated unsaturated acids which avoids the difficulties encountered in the prior art processes.

Another object of the present invention is to provide a catalytic process for preparing halogenated unsaturated acids from alpha-halogenated carboxylic acids and unsaturated hydrocarbons.

A further object of the present invention is to provide a process for preparing halogenated unsaturated acids by reacting alpha-halogenated carboxylic acids and unsaturated hydrocarbons in the presence of a solid catalyst system.

These and other objects of the present invention will become readily apparent from the ensuing description and illustrative embodiments.

In accordance with the present invention, it has now been found that alpha-halogenated, aliphatic carboxylic acids can be directly reacted with unsaturated hydrocarbons such as dienes and alkenes in the presence of a metal halide catalyst to produce the corresponding halogenated unsaturated acids. In general, the reaction is carried out at temperatures which may range from ambient up to about 150° C., preferably about 70° to 110° C., and under autogenous pressure which may range from atmospheric to 500 p.s.i.g., depending on the temperature. However, when an inert gas such as nitrogen or argon is employed in the reaction zone, the upper pressure limit may be 2000 p.s.i.g. or higher. The time period for completing the reaction obviously may vary over a wide range, although the reaction is generally completed in about 10 to 48 hours. It will be understood, however, that the foregoing reaction conditions as well as the reaction conditions set forth in the illustrative embodiments are not to be considered as critical features of the process of this invention.

The alpha-halogenated carboxylic acids useful as one of the starting materials in the present process are aliphatic monocarboxylic acids having from about 2 to 12, and preferably about 2 to 6, carbon atoms per molecule. The polyhalogenated carboxylic acids such as dichloroacetic acid and trichloroacetic acid are especially preferred for the present purposes. Monohalogenated carboxylic acids such as monobromacetic acid have also proven to be highly effective as a starting material. It is also contemplated that the halogen substituents in the monocarboxylic acids may be iodine, and it is possible to employ alpha-halogenated carboxylic acids having mixed halogen substituents. In general, the aliphatic monocarboxylic acid will have the following structural formula:

$$R_k CH_m (Hal)_n COOH$$

wherein R is an alkyl group having from 1 to 5 carbon atoms per molecule,
Hal is a halogen substituents selected from the group consisting of chlorine, bromine, iodine and mixtures thereof,
$n$ is an integer 1, 2 or 3,
$m$ is an integer 0, 1 or 2,
$k$ is an integer 0, 1 or 2, and
$k+m+n=3$.

The other major reactant in the process of this invention is an unsaturated hydrocarbon having from about 2 to 20 carbon atoms per molecule. The unsaturated hydrocarbons may either be dienes, especially conjugated dienes, having from 4 to 20, preferably about 4 to 6 carbon atoms, or alkenes having from about 2 to 10 carbon atoms per molecule. Typical dienes and alkenes which have been found useful in carrying out the process of this invention include 1,3-butadiene
1,3-pentadiene
2,3-dimethyl-1,3-butadiene
4-methyl-1,3-pentadiene
2,5-dimethyl-2,4-hexadiene
2-methyl-1,3-butadiene
cyclohexadiene-1,3
cyclopentadiene-1,3
octadecadiene-1,3
ethylene
propylene
butenes
hexenes
octenes, etc.

Although, in general, the mole ratio of the alpha-halogenated carboxylic acid to the olefin or diolefin need only be approximately 1:1, the mole ratio of the reactants may range from about 1:0.1 to 0.05:1, and more specifically from about 2:1 to 1:2.

The preferred metal halide catalysts have been found to be cuprous chloride and ferrous chloride. Only catalytic amounts of the metal halide need be employed. The amount of catalyst may, however, range from about 0.007 to about 0.030 mole per mole of reactant; it being understood that the amount of catalyst actually employed is not an essential feature of this invention.

The use of a polar-type solvent in the reaction mixture has also been found helpful in carrying out the process of this invention. Examples of such solvents are acetonitrile, benzonitrile, isopropanol, dimethyl sulfoxide, dimethyl formamide, and the like. The use of acetonitrile is especially preferred, although for operations at higher reaction temperatures it may be advantageous to employ a higher boiling solvent such as benzonitrile. When a solvent such as isopropanol is employed there is some likelihood that the halogenated unsaturated acid product will be recovered in the form of its isopropyl ester. No such effect is obtained when non-hydroxylic solvents are employed. The amount of solvent employed need only be sufficient to dissolve all or some of the reaction mixture. In general, however, the amount of solvent will be in the range of 50 to 300 ml. per mole of monocarboxylic acid.

When the preferred reactants, such as 1,3-butadiene and polyhalogenated acetic acid are employed in the process of this invention, the resulting products are the polyhalo-4-hexenoic acids. For example, di- and trichloroacetic acids readily react with butadiene in the presence of catalytic amounts of cuprous of ferrous chloride to give good yields of 2,6-dichloro-4-hexenoic acid or 2,2,6-trichloro-4-hexenoic acid, respectively. On the other hand, when monobromoacetic acid is employed as the alpha-halogenated carboxylic acid feed material, the product obtained is 6-bromo-4-hexenoic acid. It will be understood, however, that the present invention is not necessarily limited to the production of halogenated-4-hexenoic acids, since unsaturated hydrocarbons other than 1,3-butadiene and alpha-halogenated aliphatic carboxylic acids other than halogenated acitic acid may be readily employed.

In general, the process of this invention comprises adding the unsaturated hydrocarbon, the alpha-halogenated carboxylic acid and the metal halide catalyst to a reaction zone, and then heating the resulting reaction mixture to the aforedescribed temperature range. In the following illustrative embodiments, the reactions were carried out in a Parr pressure bomb under autogenous pressure conditions. When a solvent such as acetonitrile is employed, it is generally preferred to use it in a freshly distilled form to insure the absence of undesirable impurities. It has further been found helpful in some instances to purge the reaction zone or vessel with an inert gas such as nitrogen prior to the addition of the conjugated diene.

After the reaction has been completed, the resulting reaction product mixture is filtered to remove solids, if present, and the filtrate concentrated at atmospheric pressure. It is also desirable in some cases to concentrate the product mixture further by treatment such as distillation under reduced pressures to recover various fractions. The exact method employed to recover the desired products from the reaction product mixture is not an essential feature of the present invention.

The invention will be more fully understood by reference to the following illustrative embodiments. It will be understood, however that there is no intention to restrict the invention either to the materials or to the operating conditions utilized in these illustrative embodiments.

EXAMPLE I

To a glass lined Parr pressure bomb were added 0.015 mole of cuprous chloride, 70 ml. of purified acetonitrile and 0.25 mole of dichloroacetic acid. The bomb was then closed and purged with nitrogen. Butadiene (0.22 mole) was next added to the bomb, and the resulting reaction mixture was heated at 110° C. for 12 hours. When the bomb was opened a homogeneous reaction product solution was found. This solution was first concentrated at atmospheric pressure and then under reduced pressure. The fraction boiling at 65°–88° C./0.7 mm. was collected, and infrared analysis revealed the following functional groups: C=O, OH, $CH_2$—Cl, Cl—C—C=O, trans C=C, and no vinyl C=C. The product was determined to be 2,5-dichloro-4-hexenoic acid having a refractive index of $n_D^{22}=1.4801$ and a molecular weight of approximately 189 (theoretical=183). The yield was about 66% based on dichloroacetic acid.

EXAMPLE II

Utilizing the same equipment of Example I another run was carried out with isopropanol as the solvent in place of the acetonitrile. The amount of isopropanol employed was 100 ml. In addition to 0.012 mole of cuprous chloride, and 0.26 mole of 1,3-butadiene there was employed 0.10 mole of trichloroacetic acid. The reaction temperature was 74° C., and the reaction was carried out for a time period of about 41 hours. The 2,2,6-trichloro-4-hexenoic acid product was obtained as the isopropyl ester in a 70% yield based on the trichloroacetic acid. The molecular weight was found to be 237 (theoretical=259).

EXAMPLE III

Utilizing the same equipment of Example I another run was carried out by reacting 1,3-butadiene (0.52 mole) with an acetonitrile (70 ml.) solution of ferrous chloride (0.0075 mole) and bromoacetic acid (0.15 mole). The reaction was carried out at a temperature of about 113° C. for 12 hours. The resulting reaction product mixture was filtered and distilled at reduced pressure. The fraction boiling between 58°–88° C./1.5 mm. had a molecular weight of about 213. The theoretical molecular weight for 6-bromo-4-hexenoic acid is 193. The fraction was dissolved in diethyl ether and hydrogenated at 3 atmospheres using 5% Pd/carbon as the catalyst. Approximately 41 p.s.i.g. hydrogen was taken up, whereas theoretically about 46 p.s.i.g. hydrogen would be required to saturate and dehalogenate the 6-bromo-4-hexenoic acid. The ether solvent was subsequently removed, and the residue analyzed qualitatively. Infrared and vapor phase chromatographic analyses identified the residue as hexanoic acid.

EXAMPLE IV

Utilizing the same equipment and reaction conditions of Example I, ethylene was reacted with dichloroacetic acid in the presence of acetonitrile as the solvent and cuprous chloride as the catalyst. The product, 2,4-dichlorobutyric acid, had a boiling point of 140–152° C./44 mm., a refractive index $n_D^{26}=1.4605$, and a molecular weight of 165.

The above data show that the process of this invention can be readily employed to prepare various halogenated aliphatic carboxylic acids by reacting dienes or alkenes with various alpha-halogenated saturated carboxylic acids in the presence of a metal halide catalyst. Excellent yields are obtained by practicing the method of this invention, and problems associated with the formation of undesirable by-products appear to be obviated.

While particular embodiments of this invention are shown above, it will be understood that the invention is obviously subject to variations and modifications without departing from its broader aspects.

What is claimed is:

1. Process for the preparation of halogenated carboxylic acids which comprises reacting an unsaturated hydrocarbon having from 2 to 18 carbon atoms per molecule selected from the group consisting of dienes and alkenes with an alpha-halogenated, aliphatic monocarboxylic acid having the formula $R_kCH_m(Hal)_nCOOH$ wherein R is an alkyl group having from 1 to 5 carbon atoms per molecule; Hal is a halogen substituent selected from the group consisting of chlorine, bromine, iodine, and mixtures thereof; $n$ is an integer of 1 to 3; $m$ and $k$ is each an integer of 0 to 2; and $k+m+n$ equals 3 in the presence of a metal halide catalyst selected from the group consisting of cuprous halide and ferrous halide at temperatures ranging from ambient up to 150° C. and in the presence of a polar-type solvent.

2. The process of claim 1 wherein said unsaturated hydrocarbon is a diene having from 4 to 6 carbon atoms.

3. The process of claim 1 wherein said unsaturated hydrocarbon is an alkene having from 2 to 10 carbon atoms.

4. The process of claim 1 wherein said alpha-halogenated monocarboxylic acid is dichloroacetic acid.

5. The process of claim 1 wherein said alpha-halogenated monocarboxylic acid is trichloroacetic acid.

6. The process of claim 1 wherein said alpha-halogenated monocarboxylic acid is monobromoacetic acid.

7. The process of claim 1 wherein said metal halide catalyst is cuprous chloride.

8. The process of claim 1 wherein said metal halide catalyst is ferrous chloride.

9. The process of claim 1 wherein said solvent is selected from the group consisting of acetonitrile, benzonitrile, isopropanol, dimethyl sulfoxide and dimethyl formamide.

10. The process of claim 9 wherein said solvent is acetonitrile.

11. A process for the preparation of halogenated 4-hexenoic acids which comprises reacting 1,3-butadiene with an alpha-halogenated, aliphatic monocarboxylic acid having the formula $R_kCH_m(Hal)_nCOOH$ wherein R is an alkyl group having from 1 to 5 carbon atoms per molecule; Hal is a halogen substituent selected from the group consisting of chlorine, bromine, iodine, and mixtures thereof; $n$ is an integer of 1 to 3; $m$ and $k$ is each an integer of 0 to 2; and $k+m+n$ equal 3 in the presence of a polar-type solvent and catalytic amounts of a catalyst selected from the group consisting of ferrous chloride and cuprous chloride at a temperature which is at least ambient.

12. The process of claim 11 wherein said temperature is within the range of about 70° to 110° C.

13. The process of claim 11 wherein said solvent is selected from the group consisting of acetonitrile, benzonitrile, isopropanol, dimethyl sulfoxide and dimethyl formamide.

14. The process of claim 11 wherein said catalyst is cuprous chloride.

15. The process of claim 11 wherein said catalyst is ferrous chloride.

16. A process for the preparation of halogenated acids which comprises reacting ethylene with an alpha-halogenated, aliphatic monocarboxylic acid having the formula $R_kCH_m(Hal)_nCOOH$ wherein R is an alkyl group having from 1 to 5 carbon atoms per molecule; Hal is a halogen substituent selected from the group consisting of chlorine, bromine, iodine, and mixtures thereof; $n$ is an integer of 1 to 3; $m$ and $k$ is each an integer of 0 to 2; and $k+m+n$ equals 3 in the presence of a polar-type solvent and catalytic amounts of a catalyst selected from the group consisting of cuprous chloride and ferrous chloride at a temperature which is at least ambient.

17. The process of claim 16 wherein said temperature is within the range of about 70° to 110° C.

18. The process of claim 16 wherein said solvent is selected from the group consisting of acetonitrile, benzonitrile, isopropanol, dimethyl sulfoxide and dimethyl formamide.

References Cited
UNITED STATES PATENTS 3,239,553   3/1966   Rust et al. _____ 260—534 XR

OTHER REFERENCES

Leto et al.: J. Organic Chem., vol. 27 (October 1962), pp. 3708–3710.

Walling: "Free Radicals in Solution," John Wiley and Sons, New York, 1957, pp. 575–579.

LORRAINE A. WEINBERGER, *Primary Examiner.*

A. P. HALLUIN, *Assistant Examiner.*